US008819344B1

(12) United States Patent  
Faibish et al.

(10) Patent No.: US 8,819,344 B1  
(45) Date of Patent: Aug. 26, 2014

(54) SHARED STORAGE ACCESS LOAD BALANCING FOR A LARGE NUMBER OF HOSTS

(75) Inventors: Sorin Faibish, Newton, MA (US); Per Brashers, Oakland, CA (US); James Pedone, West Boylston, MA (US); Jason Glasgow, Newton, MA (US); Xiaoye Jiang, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 698 days.

(21) Appl. No.: 11/836,735

(22) Filed: Aug. 9, 2007

(51) Int. Cl.
*G06F 12/10* (2006.01)

(52) U.S. Cl.
USPC .......................................................... 711/147

(58) Field of Classification Search
None
See application file for complete search history.

(56) References Cited

U.S. PATENT DOCUMENTS

| | | | |
|---|---|---|---|
| 5,206,939 A | 4/1993 | Yanai et al. | |
| 5,269,011 A | 12/1993 | Yanai et al. | |
| 5,893,140 A | 4/1999 | Vahalia et al. | |
| 6,161,104 A | 12/2000 | Stakutis et al. | |
| 6,173,293 B1 | 1/2001 | Thekkath et al. | |
| 6,185,601 B1 | 2/2001 | Wolff | |
| 6,192,408 B1 | 2/2001 | Vahalia et al. | |
| 6,195,703 B1 | 2/2001 | Blumenau et al. | |
| 6,237,063 B1 | 5/2001 | Bachmat et al. | |
| 6,341,333 B1 | 1/2002 | Schreiber et al. | |
| 6,574,667 B1 | 6/2003 | Blumenau et al. | |
| 6,711,649 B1 | 3/2004 | Bachmat et al. | |
| 6,766,416 B2 | 7/2004 | Bachmat | |
| 6,816,891 B1 | 11/2004 | Vahalia et al. | |
| 6,842,422 B1 * | 1/2005 | Bianchini, Jr. | 370/216 |
| 6,904,470 B1 | 6/2005 | Ofer | |
| 6,973,455 B1 | 12/2005 | Vahalia et al. | |
| 6,976,134 B1 | 12/2005 | Lolayekar et al. | |
| 7,024,427 B2 | 4/2006 | Bobbitt et al. | |
| 7,051,182 B2 | 5/2006 | Blumenau et al. | |
| 7,185,062 B2 | 2/2007 | Lolayekar et al. | |
| 7,337,235 B2 * | 2/2008 | Allen et al. | 709/239 |
| 2003/0188102 A1 * | 10/2003 | Nagasoe et al. | 711/114 |
| 2004/0030822 A1 | 2/2004 | Rajan et al. | |
| 2004/0059822 A1 | 3/2004 | Jiang et al. | |

(Continued)

OTHER PUBLICATIONS

J. Satran et al., "Internet Small Computer Systems Interface (iSCSI)," Network Working Group, Request for Comments: 3720, Apr. 2004, 240 pages, The Internet Society, Reston, VA.

(Continued)

*Primary Examiner* — Duc Doan
(74) *Attorney, Agent, or Firm* — Richard Auchterlonie; Novak Druce Connolly Bove + Quigg LLP

(57) ABSTRACT

A data processing system includes host data processors, a data storage system including data storage shared among the host data processors, and a data switch coupling the host data processors to the data storage system. The data storage system has host adapter ports coupled to the data switch. The data switch is programmed for distributing block I/O requests from the host data processors over the operable host adapter ports for load balancing of the block I/O requests among the operable host adapter ports. The shared data storage can be a file system striped across RAID sets of disk drives for load balancing upon disk director ports of the data storage system. The data processing system can be expanded by adding more data storage systems, switches for the additional data storage systems, and switches for routing block I/O requests from the host processors to the data storage systems.

8 Claims, 11 Drawing Sheets

(56) References Cited

U.S. PATENT DOCUMENTS

| | | | |
|---|---|---|---|
| 2005/0044162 | A1 | 2/2005 | Liang et al. |
| 2005/0114429 | A1 | 5/2005 | Caccavale |
| 2005/0198401 | A1 | 9/2005 | Chron et al. |
| 2005/0246382 | A1 | 11/2005 | Edwards |
| 2006/0075191 | A1 | 4/2006 | Lolayekar et al. |
| 2008/0127199 | A1* | 5/2008 | Miki .............................. 718/105 |

OTHER PUBLICATIONS

D. Patterson et al., "Introduction to Redundant Arrays of Inexpensive Disks (RAID)," Spring Compcon 89, Thirty-fourth IEEE Computer Society International Conference, Feb. 27-Mar. 3, 1989, p. 112-117, IEEE, New York, NY.

"Introducing RAID 5 on Symmetrix DMX," EMC White Paper, 2004, 12 pages, EMC Corporation, Hopkinton, MA.

"Enginuity: The Symmetrix Storage Operating Environment," EMC White Paper, 2005, 21 pages, EMC Corporation, Hopkinton, MA.

"EMC Symmetrix DMX Architecture," Product Description Guide, 2004, 76 pages, EMC Corporation, Hopkinton, MA.

Symmetrix 8000 Enterprise Storage Systems Product Description Guide, Mar. 2001, 46 pages, EMC Corporation, Hopkinton, MA.

"EMC CLARiiON CX3 Best Practices for Achieving "Five 9s" Availability," Feb. 2007, 14 pages, EMC Corporation, Hopkinton, MA.

"EMC PowerPath," Datasheet, Aug. 2006, 4 pages, EMC Corporation, Hopkinton, MA.

"EMC PowerPath," Product Description Guide, Feb. 2005, 24 pages, EMC Corporation, Hopkinton, MA.

"Understanding EtherChannel Load Balancing and Redundancy on Catalyst Switches," Document ID:12023, Jul. 9, 2007, 11 pages, Cisco Systems, Inc., San Jose, CA.

"Highly Available Storage: Multipathing and Microsoft MPIO Driver Architecture," White Paper, Oct. 2003, 16 pages, Microsoft Corporation, Redmond, WA.

Menon et al., "IBM Storage Tank—a heterogeneous scalable SAN file system," IBM Systems Journal, vol. 42, No. 2, 2003, pp. 250-267, IBM Corp., Armonk, NY.

"File Virtualization with Acopia's Adaptive Resource Switching," 2004, 9 pages, Acopia Networks, Lowell, MA.

* cited by examiner

SHARED STORAGE ACCESS LOAD BALANCING FOR A LARGE NUMBER OF HOSTS

FIELD OF THE INVENTION

The present invention relates to load balancing of storage access requests in a data storage system.

BACKGROUND OF THE INVENTION

Data storage is most economically provided by a storage system including a redundant array of inexpensive disks (RAID). For servicing a large number of network clients, a server is interposed between the network clients and the storage system for authenticating the client requests and for mapping the client requests to storage addresses in the storage system. For servicing a large number of hosts in a computational grid environment, a data switch is interposed between the hosts and the storage system.

When a storage system provides storage for a large number of network clients or a large number of hosts, there has often been a problem that storage access performance has been limited by the data paths between the server or switch and the storage system due to imbalance or overload upon these data paths. This problem has been addressed by various manual and automatic methods of system configuration and load balancing.

Traditionally, a system administrator has planned I/O bandwidth allocation to the client or host applications so that the I/O load is spread over as many paths as are available in the configuration. At the same time, the system administrator has considered the individual storage requirements for each client or host application. Often a significant load imbalance would occur in this environment, causing erratic application performance. Then the system administrator would re-allocate the client or host applications to different paths in order to re-balance the I/O load.

More recently, file servers have been provided with an automatic and dynamic load balancing facility for distributing client I/O requests across all available paths from the server to the storage devices that may service the I/O requests. For example, EMC Corporation has sold the PowerPath® load balancing facility in the form of a software layer between the file system and the SCSI device driver in the file server. The PowerPath® load balancing facility directs each I/O request to a selected port of the storage system based on one of four pre-selected load balancing policies. The system administrator can chose an adaptive policy (the default polity), a round-robin policy, a least I/Os policy, or a least-blocks policy. The adaptive policy is to select the path on the basis of path load (queue with the shortest depth in time) and device priority. The round-robin policy selects the next available path in rotation. The least I/Os policy selects the path with the fewest pending I/O requests. The least blocks policy selects the path with the fewest pending blocks of I/O data.

Although the PowerPath® load balancing facility has been very successful for balancing the load of a single file server upon a data storage system, problems often arise when a data storage system receives I/O requests from more than one file server or host. Without coordination between all of the file servers or hosts feeding I/O requests to the data storage system, load balancing locally at each file server or host based on the local activity at the file server or host may not achieve load balancing globally across all of the ports or storage devices of the data storage system. A loss of host performance is often noticed when file servers or hosts are added to the data processing system. The host performance may be decreased further by an increase in the number of pipes accessing the storage if there is limited network throughput, for example, in a system using 1 gigabit Ethernet pipes.

Loss of performance due to load balancing locally at each file server or host based on activity at the file server or host may become very significant when file servers or hosts share access to the same RAID group, file system, or file. In this case, there may be no increase in activity at any one file server or host if there is an imbalance in loading on certain ports of the storage system due to concurrent access to the shared RAID group, file system, or file. This problem may often arise in a computational grid environment for scientific or engineering applications that use a large number of hosts for parallel processing and use the storage system for passing intermediate results between the hosts. The problem is the same for various storage access protocols such as SCSI, SCSI over IP (iSCSI), InfiniBand, and Fibre Chanel (FC). The problem is aggravated when the hosts use virtual machines such as VMware (Trademark) virtual machines, in which case the unbalance is ported inside the host between multiple virtual machines.

SUMMARY OF THE INVENTION

In accordance with one aspect, the invention provides a data processing system. The data processing system includes host data processors, a data storage system including data storage shared among the host data processors, and a data switch coupling the host data processors to the data storage system for transmitting block I/O requests from the host data processors to the data storage system for access to respective blocks of the shared data storage. The data storage system has host adapter ports coupled to the data switch. The shared data storage is accessible from operable host adapter ports, and the data switch is programmed for distributing the block I/O requests over the operable host adapter ports for load balancing of the block I/O requests among the operable host adapter ports.

In accordance with another aspect, the invention provides a data processing system. The data processing system includes host data processors, and data storage systems. Each of the data storage systems includes data storage shared among the host data processors. The data processing system also includes a respective data switch coupled to each of the data storage systems for distributing block I/O requests from the host data processors to the data storage system for access to respective blocks of the shared data storage. The data processing system further includes a respective data switch coupled to each of the host data processors and coupled to the respective data switches coupled to the data storage systems for distributing block I/O requests from the host data processor to the respective data switches coupled to the data storage systems. The shared data storage included in each of the data storage systems is accessible from operable host adapter ports of the data storage system. The respective data switch coupled to each of the data storage systems is programmed for distributing the block I/O requests from the respective data switch coupled to the data storage system over the operable host adapter ports for load balancing of the block I/O requests from the respective data switch coupled to the data storage system among the operable host adapter ports. Moreover, each of the data storage systems has disk director ports coupled to the host adapter ports for transmission of the block I/O requests received at the host adapter ports from the host adapter ports to the disk director ports, and strings of disk drives coupled to respective ones of the disk director ports for transmission of the block I/O requests from the disk director ports to the strings of the disk drives. The shared storage of each of the data storage systems includes at least one file system striped across the strings of the disk drives so that block I/O requests for sequential access of the file system are distributed across the disk director ports for load balancing of the block I/O requests for sequential access of the file system among the disk director ports.

In accordance with yet another aspect, the invention provides a method of shared storage access load balancing in a data processing system including host processors sharing access to data storage of a data storage system. The data storage system includes host adapter ports, disk director ports, and RAID sets of disk storage devices coupled to the disk director ports. The data storage system has been configured for access of each of the disk storage devices from each of the host adapter ports. The method includes striping a file system across the RAID sets of the disk storage devices so that the file system is accessible from all of the disk director ports of the storage system, and operating at least one data switch coupled between the host data processors and the data storage system to distribute block I/O requests from the host data processors across the host adapter ports that are operable for load balancing of the block I/O requests among the operable host adapter ports.

BRIEF DESCRIPTION OF THE DRAWINGS

Additional features and advantages of the invention will be described below with reference to the drawings, in which.

Figure 1:
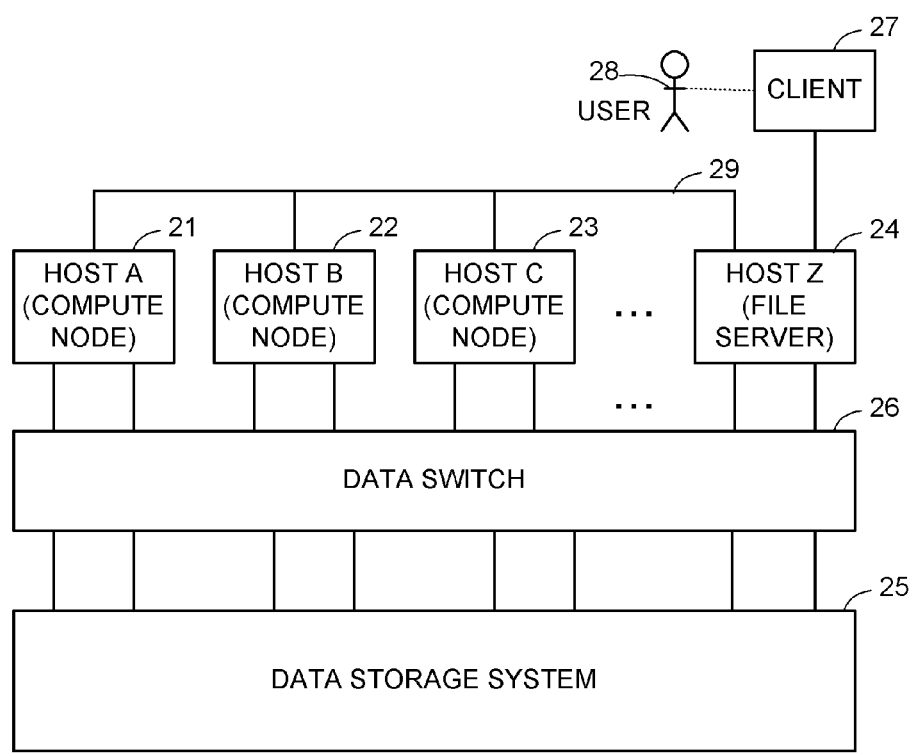
FIG. 1 is a block diagram of a data processing system for grid computing incorporating the present invention for load balancing of I/O requests from multiple hosts upon host adapter ports of a data storage system.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a data processing system for grid computing. The data processing system includes host processors 21, 22, 23, etc. programmed as compute nodes for grid computing, and a host processor 24 programmed as a file server. The host processors share access to a data storage system 25. A data switch 26 couples the host processors to the storage system 25 so that the switch may direct an I/O request from any of the host processors 21-24 to any host adapter port of the storage system.

The host processors 21-23, for example, perform finite element analysis in parallel upon local data over computational cycles. During each computational cycle, each host processor produces certain intermediate results that the other host processors need in the next computational cycle. At the end of each computational cycle, each host processor stores these shared intermediate results in the storage system 25. Each host processor begins the next computational cycle by reading the shared intermediate results that are needed from the storage system 25.

The file server 24 permits a human user 28 to access files in the storage system 25 via a client 27 such as a workstation or personal computer. For example, programs, initial data, and final results of the parallel processing by the compute nodes 21-23 are stored in files for access by the user 28. The compute nodes 21-23, for example, may access these files over a network link 29 to the file server 24 using a file access protocol. The shared intermediate results can also be stored in files.

The compute nodes 21-23 may directly access the shared intermediate results in the storage system 25 by sending SCSI, InfiniBand, or Fibre-Channel I/O commands through the switch 26 to the storage system 25. Prior to this direct access, the compute nodes may obtain from the file server 24 metadata of files containing the intermediate results. This metadata includes, for a given file and a given offset in the file, the logical address of a data block in the data storage system. For example, the compute nodes use the metadata protocol described in Vahalia et al. U.S. Pat. No. 6,973,455 issued Dec. 6, 2005, entitled "File Server System Providing Direct Data Sharing Between Clients with a Server Acting as an Arbiter and Coordinator," incorporated herein by reference.

Figure 2:
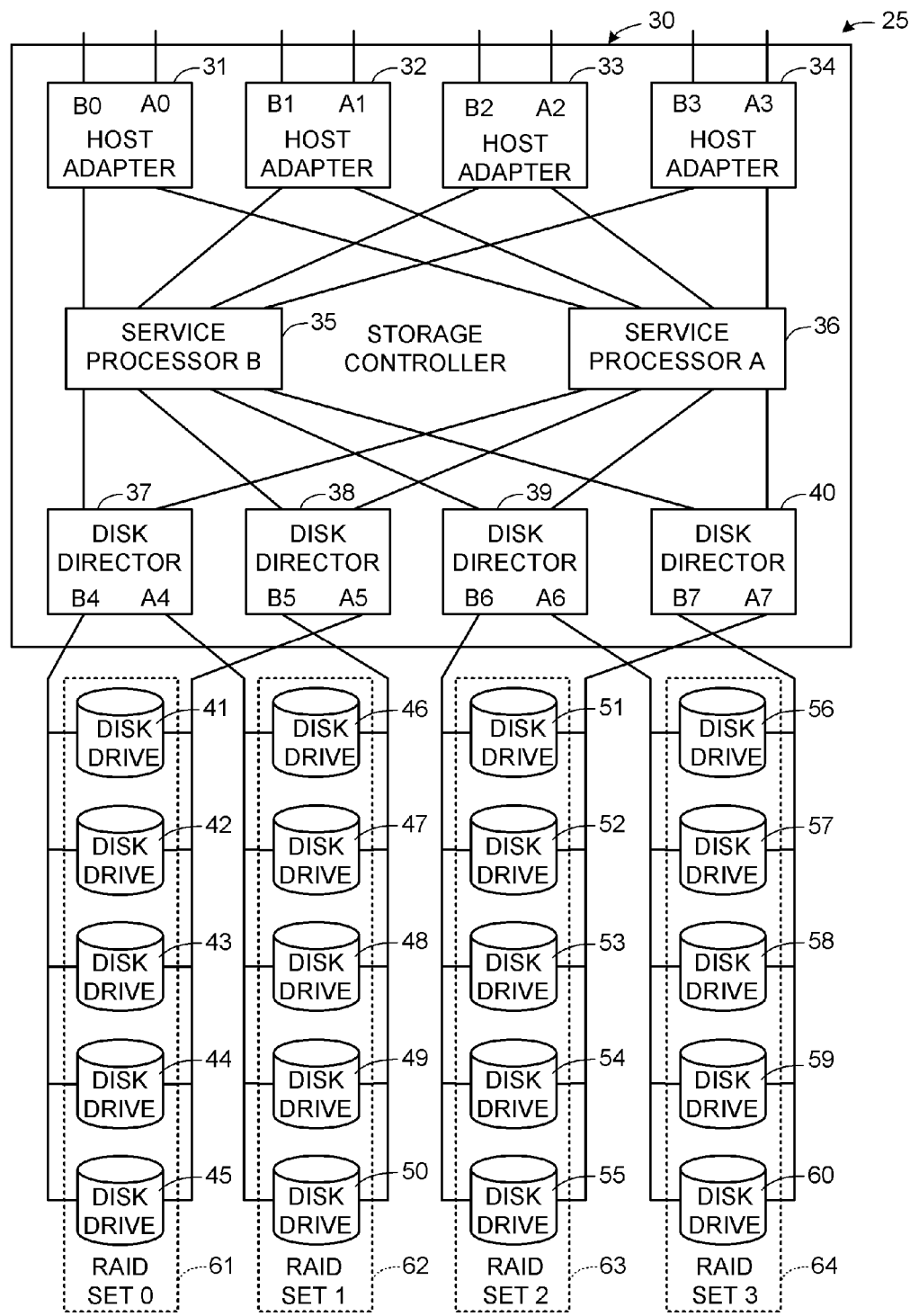
FIG. 2 is a block diagram of the data storage system introduced in FIG. 1.

FIG. 2 shows the internal organization of the data storage system 25. The data storage system includes a storage controller 30 and an array of disk drives 41-60. The storage controller includes host adapters 31-34, service processors, for example, 35, 36, and more, and disk directors 37-40. Each host adapter 31-34 includes one port for the service processor 35 and one port for the service processor 36. Each disk director 37-40 includes one port for the service processor 35 and port for the service processor 36. Therefore, the service processor 35 has four host adapter ports (B0, B1, B2, and B3) and four disk director ports (B4, B5, B6, and B7), and the service processor 36 has four host adapter ports (A0, A1, A2, and A3) and four disk director ports (A4, A5, A6, and A7). This storage controller architecture shown in FIG. 2 is used in the EMC Corporation CLARiiON® storage system. The present invention, however, can be used with other storage controller architectures, such as a cached disk array architecture described further below with reference to FIG. 15.

Each of the disk drives 41-60 has two ports. Each disk director port is linked to a string of five of the disk drives in a level-5 redundant array of inexpensive disks (RAID). A first RAID set 61 is linked in a string to the disk director port B4 and in a string to the disk director port A5. A second RAID set 62 is linked in a string to the disk director port A4 and in a string to the disk director port B5. A third RAID set 63 is linked in a string to the disk director port B6 and to the disk director port A7. A fourth RAID set 64 is linked in a string to the disk director port A6 and to the disk director port B7. Further details regarding the construction and operation of a data storage system are disclosed in Yanai et al. U.S. Pat. No. 5,206,939 issued Apr. 27, 1993, entitled "System and Method for Disk Mapping and Data Retrieval," incorporated herein by reference, and "Yanai et al. U.S. Pat. No. 5,269,011 issued Dec. 7, 1993, entitled "Dynamically Reconfigurable Data Storage System with Storage System controllers Selectively Operable as Channel Adapters on Storage Device Adapters," incorporated herein by reference.

In the data processing network of FIG. 1, there is a problem of load balancing of I/O requests and read and write data from the host processors to the disk drives in the storage system. This problem is solved by configuring the data storage system 25 so that a file system is striped across the disk drives to be accessible through all of the operable host adapter ports, and by configuring the data switch 26 to distribute block I/O requests from the host processors 21-24 for read and write access to the file system across all of the operable host adapter ports.

A preferred way of configuring the data storage system 25 so that a file system is striped across the disk drives so as to be accessible through all of the operable host adapter ports is to partition the disk drives in each RAID set so that a plurality of logical unit numbers (LUNs) of data storage are striped across each RAID set, and building the file system upon a group of the LUNs including a LUN from each of the RAID sets so that the file system is striped across the RAID sets. Thus, sequential block I/O access to the file system results in the I/O data for the block I/O being distributed across all of the disk director ports of the data storage system. Consequently, distribution of the block I/O data from the host processors 21-24 for read and write access to the file system consecutively across all of the operable host adapter ports results in uniform load balancing of the data storage system.

Figure 3:
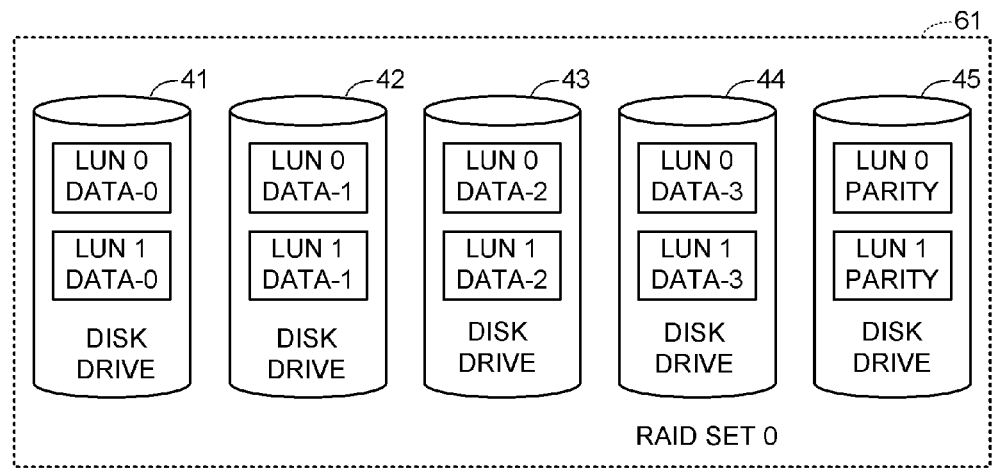
FIG. 3 is a block diagram of disk drive partitioning and LUN striping in a first RAID set of the data storage system of FIG. 2.

FIG. 3 shows that the disk drives 41, 42, 43, 44, and 45 in the first RAID set 61 are partitioned in half to produce two LUNs (LUN 0 and LUN 1) striped across the disk drives in this first RAID set. The first four disk drives 41, 42, 43, and 44 each store one-quarter of the data of each of the LUNs (LUN 0 and LUN 1), and the fifth disk drive 45 stores parity of the LUNs. Normally each of the two LUNs in the RAID set is serviced by a different one of the service processors. For example, normally LUN 0 is serviced by service processor A (36 in FIG. 2), and normally LUN 1 is serviced by service processor B (35 in FIG. 2). However, if there is a failure of the default service processor for a LUN, then the LUN will be serviced by the other service processor.

Figure 4:
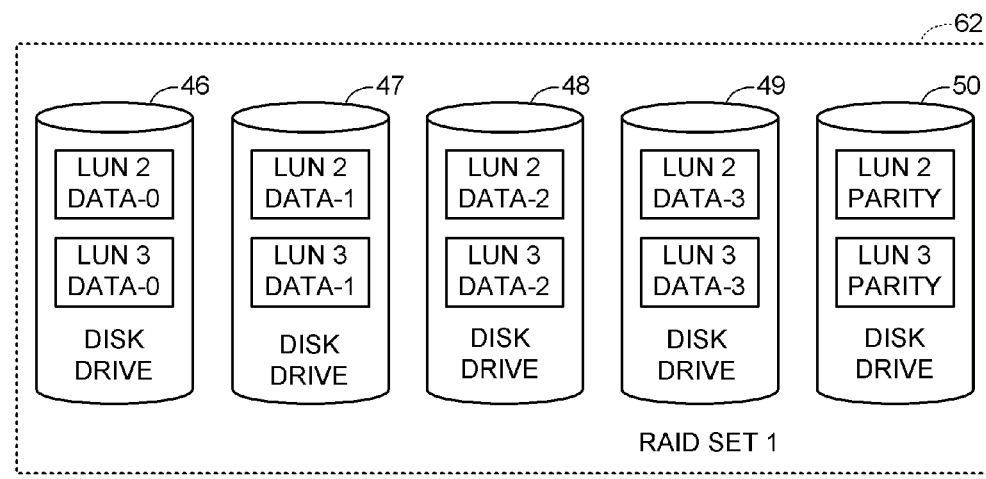
FIG. 4 is a block diagram of disk drive partitioning and LUN striping in a second RAID set of the data storage system of FIG. 2.

FIG. 4 shows that the disk drives 46, 47, 48, 49, and 50 in the second RAID set 62 are partitioned in half to produce two LUNs (LUN 2 and LUN 3) striped across the disk drives in this second RAID set. The first four disk drives 46, 47, 48, and 49 each store one-quarter of the data of each of the LUNs (LUN 2 and LUN 3), and the fifth disk drive 50 stores parity of the LUNs.

Figure 5:
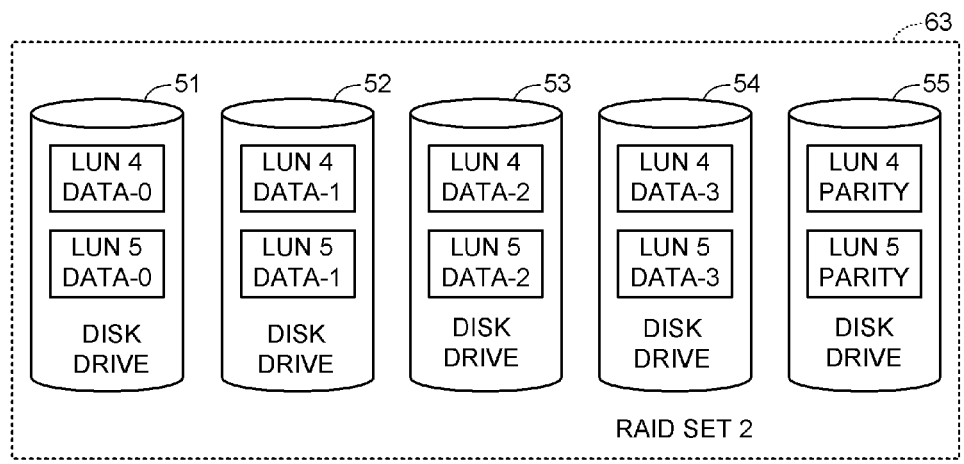
FIG. 5 is a block diagram of disk drive partitioning and LUN striping in a third RAID set of the data storage system of FIG. 2.

FIG. 5 shows that the disk drives 51, 52, 53, 54, and 55 in the third RAID set 63 are partitioned in half to produce two LUNs (LUN 4 and LUN 5) striped across the disk drives in this third RAID set. The first four disk drives 51, 52, 53, and 54 each store one-quarter of the data of each of the LUNs (LUN 4 and LUN 5), and the fifth disk drive 55 stores parity of the LUNs.

Figure 6:
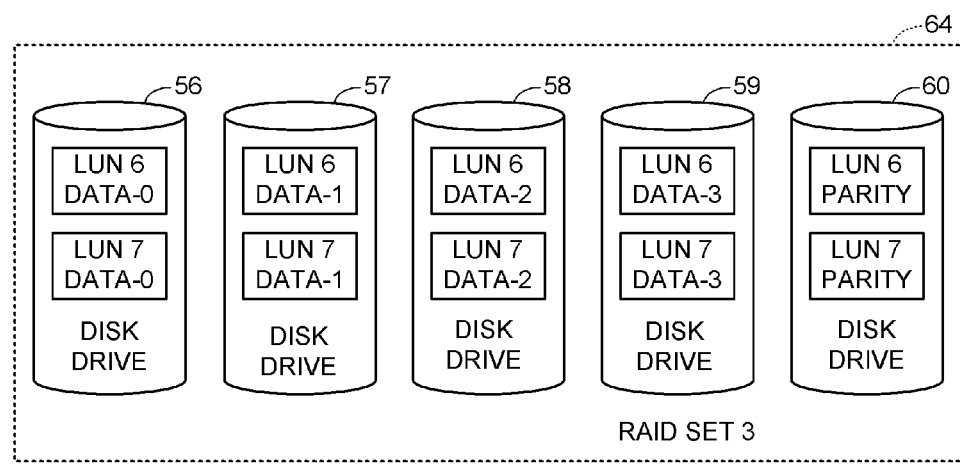
FIG. 6 is a block diagram of disk drive partitioning and LUN striping in a fourth RAID set of the data storage system of FIG. 2.

FIG. 6 shows that the disk drives 56, 57, 58, 59, and 60 in the fourth RAID set 64 are partitioned in half to produce two LUNs (LUN 6 and LUN 7) striped across the disk drives in this third RAID set. The first four disk drives 56, 57, 58, and 59 each store one-quarter of the data of each of the LUNs (LUN 6 and LUN 7), and the fifth disk drive 60 stores parity of the LUNs.

Figure 7:
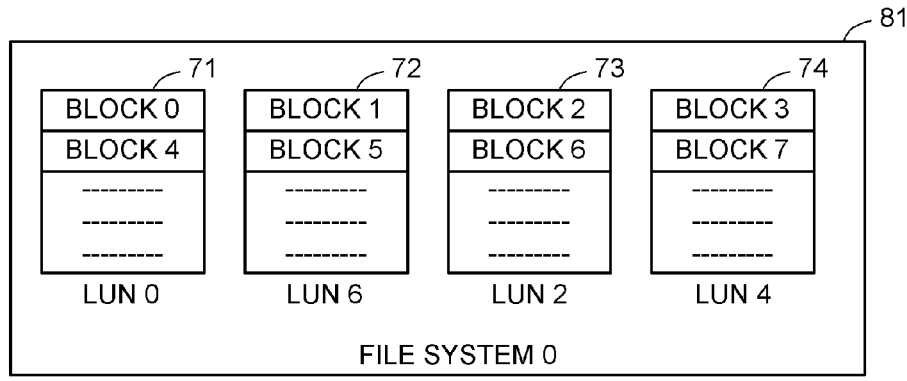
FIG. 7 is a block diagram of LUN striping in a first file system built on even numbered LUNs in the data storage system of FIG. 2.

FIG. 7 shows LUN striping in a first file system 81 built on the even numbered LUNs (LUN 0, LUN 6, LUN 4, and LUN 2) 71, 72, 73, 74 in the data storage system of FIG. 2. The file system 81 is striped across the even numbered LUNs so that sequential access to the file system 81 is performed by consecutive access to respective file system blocks in successive ones of the even numbered LUNs. Each file system block, for example, consists of 8 K bytes.

Figure 8:
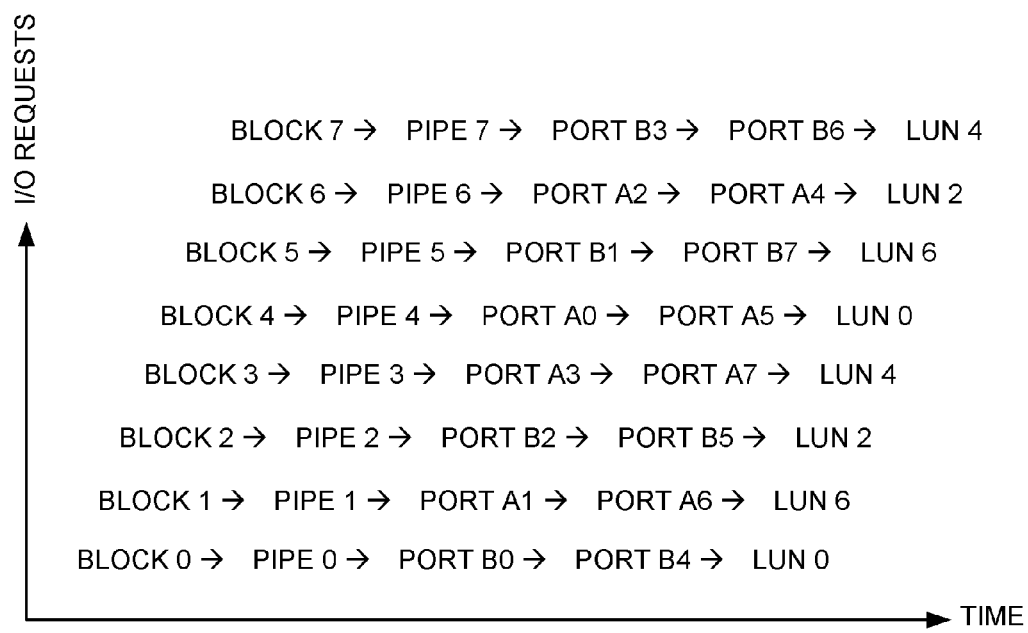
FIG. 8 is a pipeline diagram of I/O data flow for a series of block I/O requests during sequential access to the file system of FIG. 7.

As further shown in FIG. 8, the data storage system performs sequential I/O access to the first file system 81 in response to a series of block I/O requests for access to blocks 0 to 7 resulting in consecutive access to LUNs 0, 6, 2, and 4. Each block I/O request is a request to read from or write to a specified one of the file system blocks. The data switch distributes the block I/O requests for access to blocks 0 to 7 to respective pipes 0 to 7 feeding the host adapter ports B0, A1, B2, A3, A0, B1, A2, B3, respectively. Upon receipt of a block I/O request at an "A" type host adapter port, the data storage system sends the block I/O request to the "A" type disk director port linked to the RAID set containing the specified file system block. Upon receipt of a block I/O request at a "B" type host adapter port, the data storage system sends the block I/O request to the "B" type disk director port linked to the RAID set containing the specified file system block.

For example, in the storage controller (30 in FIG. 2), the block I/O request is serviced by the service processor A (36 in FIG. 2) if the LUN number in the request is an even number, and the block I/O request is serviced by the service processor B (35 in FIG. 2) if the LUN number in the request is an odd number. Thus, each host adapter (31 to 34 in FIG. 2) is programmed to look at the LUN number in each block I/O request received at its "A" or "B" host adapter port to determine whether to send the request either to the service processor A (36 in FIG. 2) or to the service processor B (35 in FIG. 2).

Figure 9:
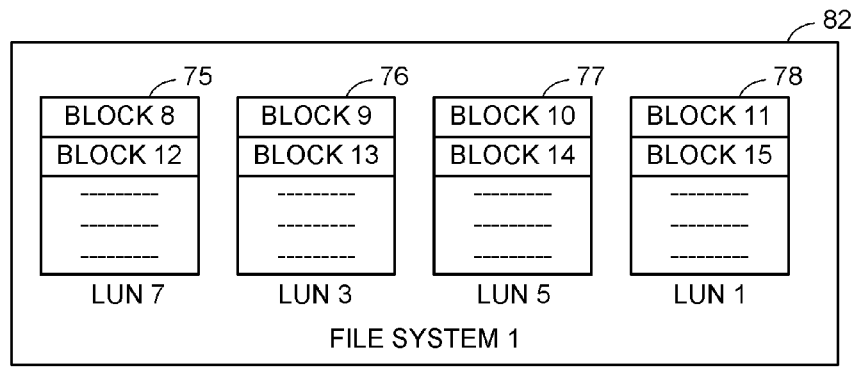
FIG. 9 is a block diagram of LUN striping in a second file system built on odd numbered LUNs in the data storage system of FIG. 2.

FIG. 9 shows LUN striping in a second file system 82 built on the odd numbered LUNs (LUN 7, LUN 3, LUN 5, and LUN 1) 75, 76, 77, 78 in the data storage system of FIG. 2. The file system 81 is striped across the odd numbered LUNs so that sequential access to the file system 81 is performed by consecutive access to respective file system blocks in successive ones of the odd numbered LUNs, and so that there is minimal contention at the disk director ports between sequential access to the first file system 81 and concurrent sequential access to the second file system 82.

Figure 10:
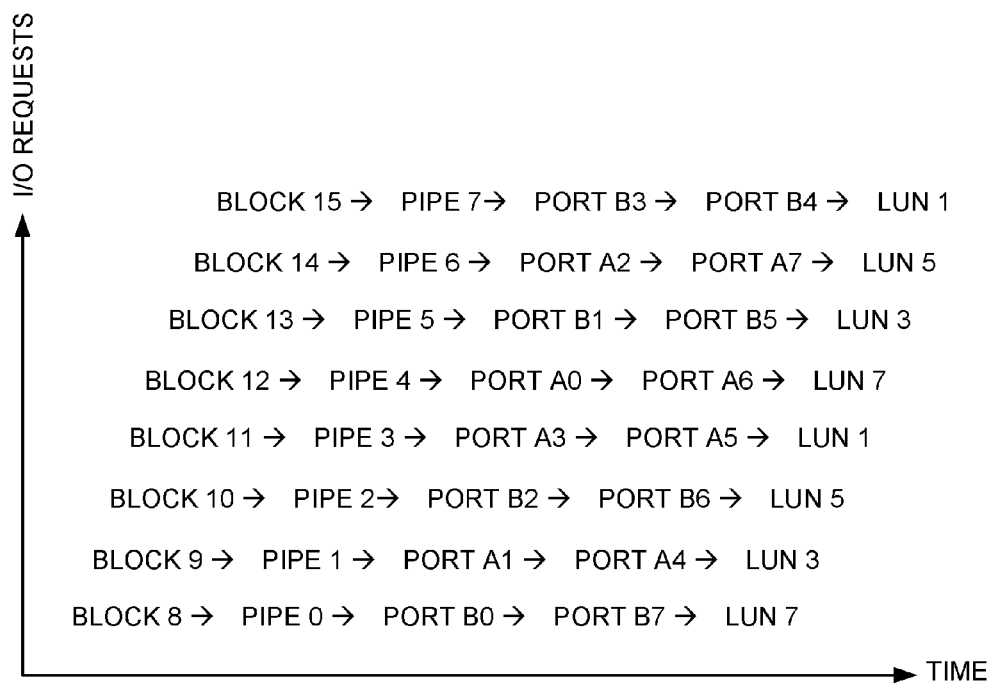
FIG. 10 is a pipeline diagram of I/O data flow for a series of block I/O requests during sequential access to the file system of FIG. 9.

As further shown in FIG. 10, the data storage system performs sequential I/O access to the second file system 82 in response to a series of block I/O requests for access to blocks 8 to 15 resulting in consecutive access to LUNs 7, 3, 5, and 1. Each block I/O request is a request to read from or write to a specified one of the file system blocks. The data switch distributes the block I/O requests for access to blocks 8 to 15 to respective pipes 0 to 7 feeding the host adapter ports B0, A1, B2, A3, A0, B1, A2, B3, respectively. Upon receipt of a block I/O request at an "A" type host adapter port, the data storage system sends the block I/O request to the "A" type disk director port linked to the RAID set containing the specified file system block. Upon receipt of a block I/O request at a "B" type host adapter port, the data storage system sends the block I/O request to the "B" type disk director port linked to the RAID set containing the specified file system block.

Figure 11:
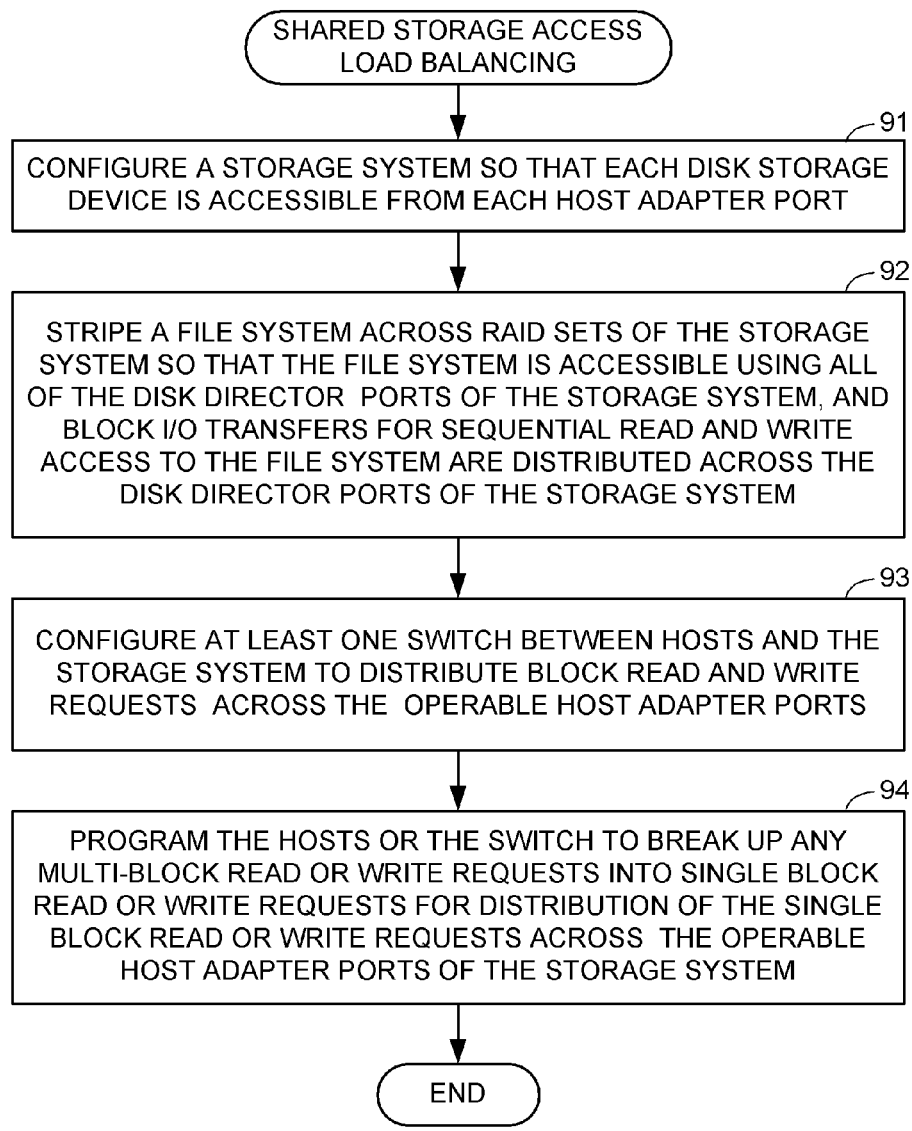
FIG. 11 is a flowchart of shared storage access load balancing in a preferred implementation of the present invention.

FIG. 11 shows the preferred method of shared storage access load balancing in the data processing system of FIG. 1. In a first step 91, the storage system is configured so that each disk storage device is accessible from each host adapter port. In step 92, a file system is striped across RAID sets of the storage system so that the file system is accessible using all of the disk director ports of the storage system, and block I/O transfers for sequential read and write access to the file system are distributed across the disk director ports of the storage system. In step 93, at least one switch between the hosts and the storage system is configured to distribute block read and write requests across the operable host adapter ports of the storage system. In step 94, the hosts or the switch are programmed to break up any multi-block read or write requests for distribution of the single block I/O requests across the operable host adapter ports of the storage system.

Figure 12:
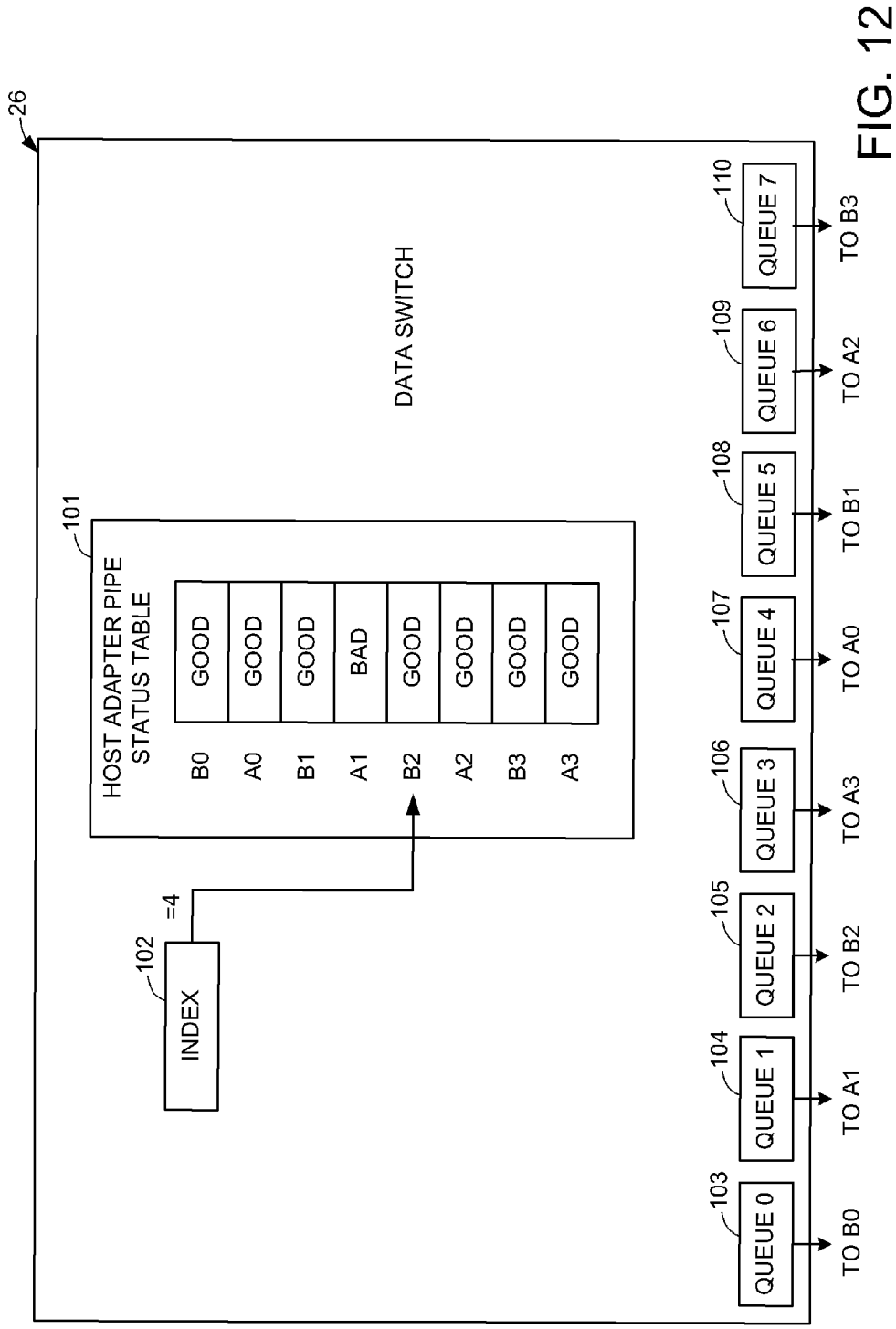
FIG. 12 is a block diagram of the switch in FIG. 1.

FIG. 12 shows features of the data switch in FIG. 1 for distributing block read and write requests across the operable host adapter ports of the storage system. The data switch 26 includes a host adapter pipe status table 101 indicating the status (good or bad) of each pipe from the switch to a respective host adapter port of the data storage system. The data switch 26 also has an index register 102 for indexing the host adapter pipe status table. The index register 102 contains an index value indicating the pipe that was last used for transmission of a request to read or write to a specified file system block in the data storage system. The data switch 26 also has a respective transmission queue 103-110 for each pipe.

Figure 13:
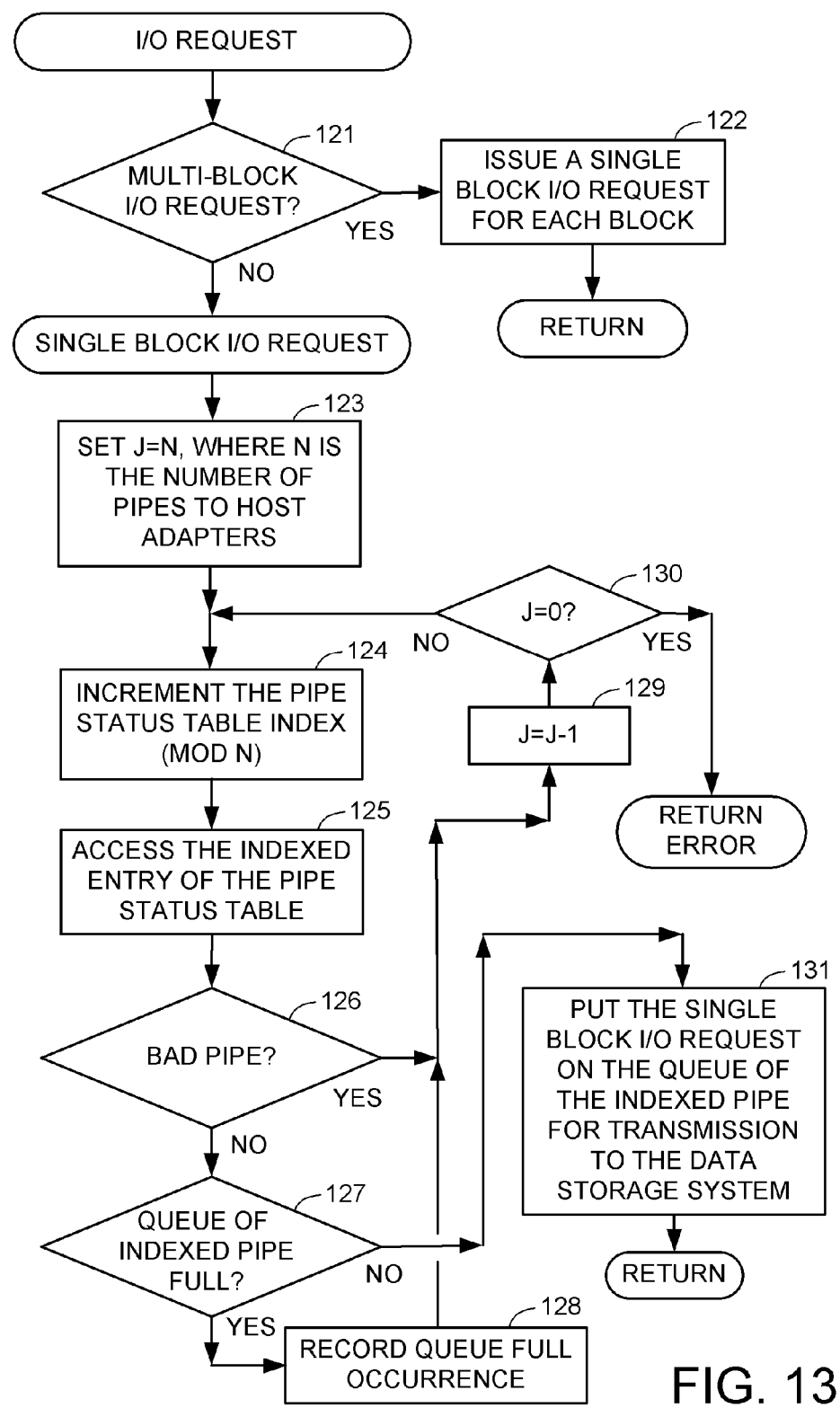
FIG. 13 is a flowchart of programming of the switch in FIG. 12 for distributing single block I/O requests consecutively across the operable host adapter ports.

FIG. 13 is a flowchart of programming of the data switch in FIG. 1 for converting a single large I/O request from an application into block I/O requests and distributing the block I/O requests across the operable host adapter ports so that each block I/O request is distributed to a next operable one of the host adapter ports in a rotational sequence. In a first step 121, if the data switch receives a multi-block I/O request (i.e., an I/O request to read from or write to more than one file system block), then execution branches to step 122. In step 122, the multi-block I/O request is broken up into a series of single block I/O requests. For each single block I/O request, execution continues to step 123. In step 123, a skip counter "J" is set to the number "N" of pipes from the switch to host adapter ports of the data storage system. In step 124, the pipe status table index is incremented, modulo N, to index a next entry of the pipe status table. In step 125, the index entry of the pipe status table is accessed in order to test the status of the indexed pipe. In step 126, if the indexed pipe is not bad, then execution continues to step 127.

In step 127, if the transmission queue for the indexed pipe is full, then execution continues to step 128 to record an occurrence of the indexed queue being full. For example, in step 128, a skip counter for the indexed pipe is incremented.

If a background service routine of the data switch finds that the value of the skip counter for a particular pipe is excessive relative to the skip counts for the other pipes, then this may indicate a problem with the pipe, and the background service routine may respond by shutting down the pipe by setting its status in the pipe status table to "bad."

Execution continues from step 128 to step 129. Execution also branches from step 126 to step 129 if the status of the indexed pipe is "bad." In step 129, the skip counter "J" is decremented by one, and then tested in step 130. If the skip counter has been decremented to zero, indicating that all of the pipes are bad or blocked by full transmission queues, then execution returns from step 130 with an error indication. For example, in response to the error indication, an overload condition is logged and reported to a system administrator. Otherwise, execution loops from step 130 back to step 124.

In step 127, if the transmission queue of the indexed pipe is not full, then execution branches to step 131. In step 131, the single block I/O request is placed on the transmission queue of the indexed pipe for transmission to the data storage system, and execution returns.

Figure 14:
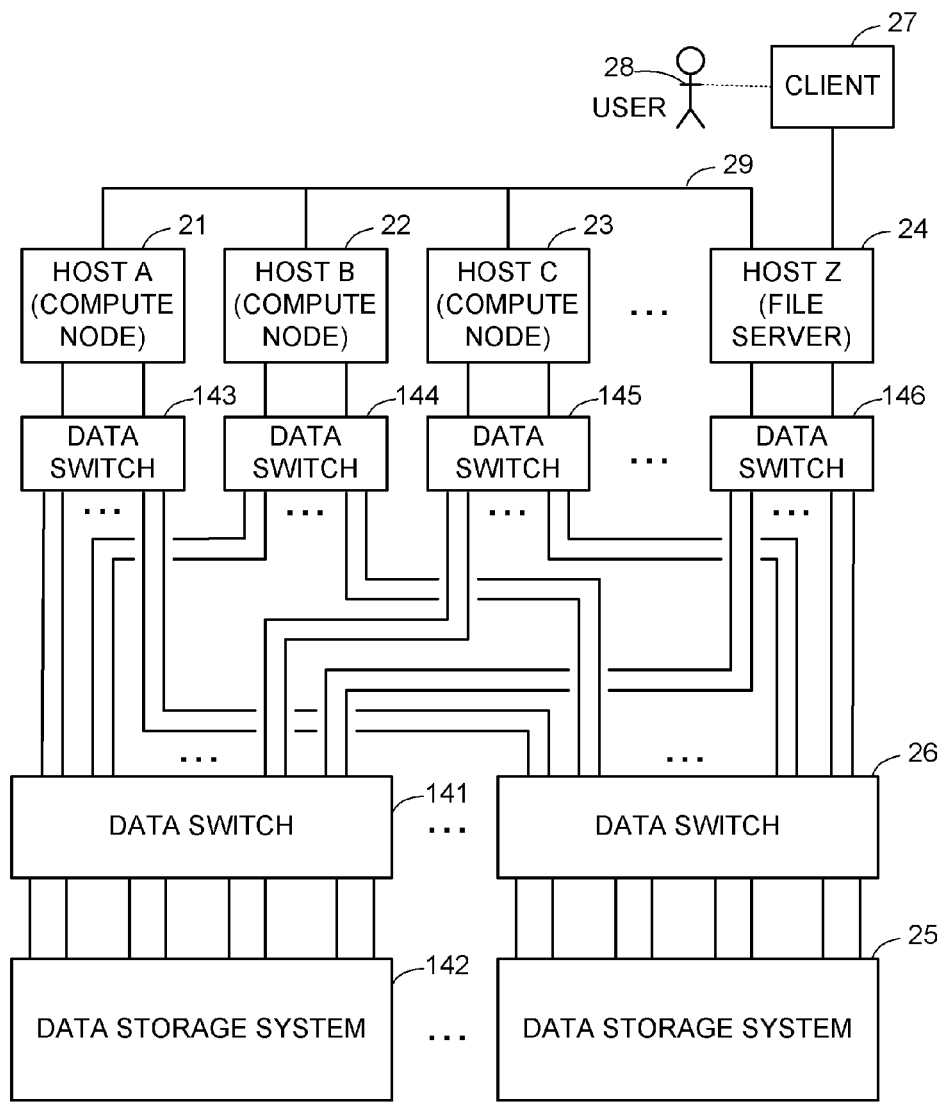
FIG. 14 is a block diagram showing a way of expanding the data processing system of FIG. 1 to incorporate additional data storage systems.

FIG. 14 shows that the data storage capacity of the data processing system of FIG. 1 can increased by adding at least one more data storage system 142 and a respective data switch 141 for distributing block I/O requests from the host data processors to each additional data storage system. If the host data processors do not have additional ports for connection to the additional data switch 141, then their ports can be expanded by a respective data switch 143-146 for each host data processor. The additional data switch 141 is configured and programmed in a fashion similar to the data switch 26, so that a single block I/O request received from a host data processor can be directed to any one of the host adapter ports of the additional data storage system 142. In contrast, each of the data switches 143-146 functions as router to route each block I/O request from its respective host data processor to the data storage system containing the file system to be accessed. For example, each data packet transmitted by a host data processor includes a destination identifier indicating the file system to be accessed, and the respective data switch 143-146 inspects this destination identifier to determine the data switch 26, 141, etc. to which the data packet is sent.

Figure 15:
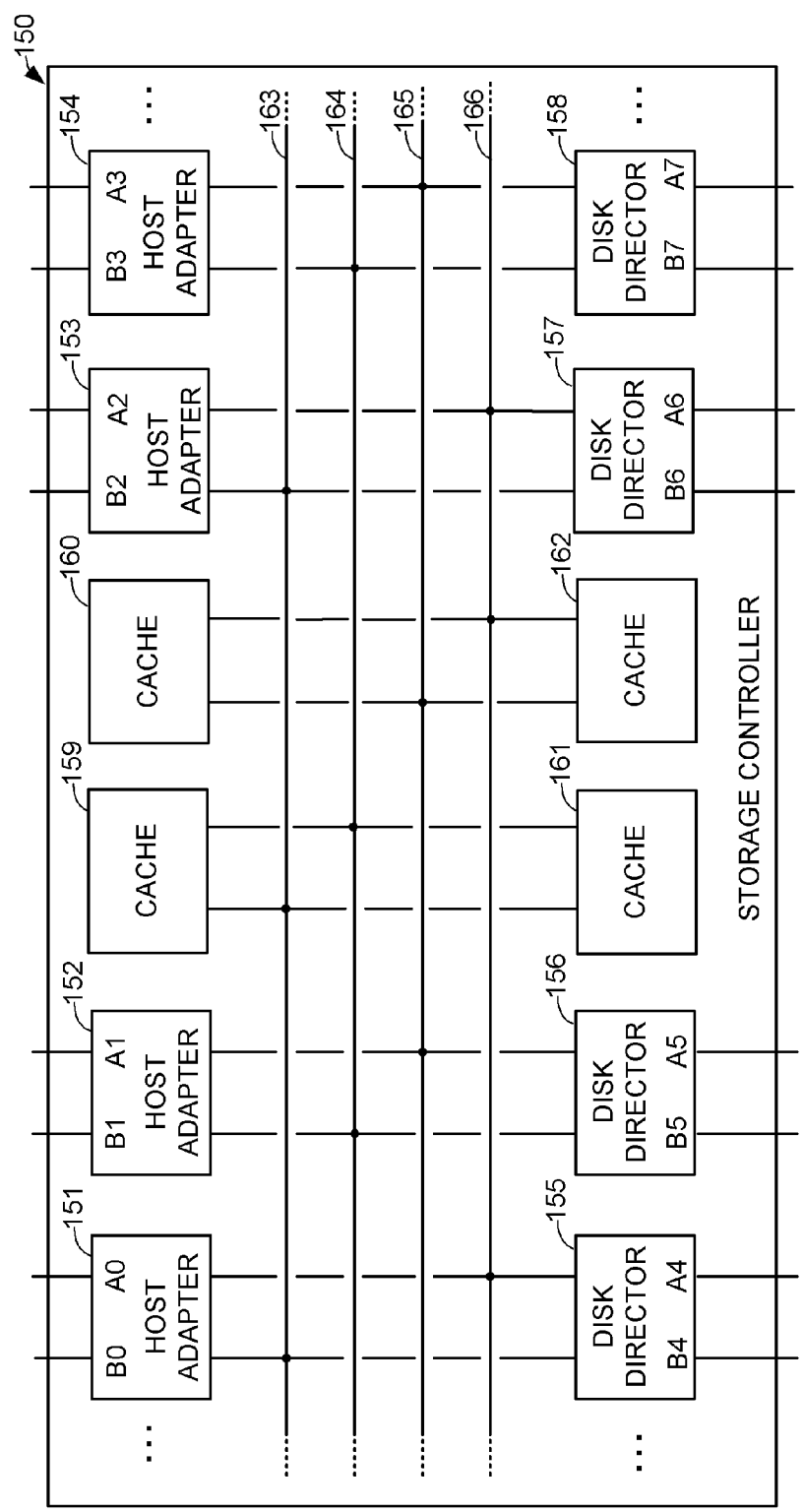
FIG. 15 is a block diagram of a storage controller for a cached disk array.

FIG. 15 shows a block diagram of a storage controller 150 for a cached disk array. This storage controller 150 can be substituted for the storage controller 30 of FIG. 2. The storage controller 150 includes host adapters 151, 152, 153, 154, and disk directors 155, 156, 157, and 158. Instead of service processors, the storage controller 150 includes cache memory blades 159, 160, 161, and 162. The host adapters, cache memory blades, and disk directors are liked together via four high-speed busses 163, 164, 165, 166. The storage controller 150 is configured so that data stored in any of the cache memory blades 159-162 and the data stored in any of the disk drives linked to the disk directors 155-158 is accessible from any of the ports of the host adapters 151-154. The cache memory, however, could be partitioned so that half of the cache memory blades (e.g., 159 and 161) store frequently accessed blocks of the even numbered LUNs, and the other half of the cache memory blades (e.g., 160 and 162) store frequently accessed blocks of the odd numbered LUNs.

In view of the above, there has been described a data processing system and method of global load balancing using a combination of storage system configuration and switch configuration so that pools of shared storage are accessed using all available paths. Block I/O requests from the hosts are distributed over the available paths to the shared storage in such a way that imbalance does not occur in the absence of path failure, and any imbalance is detected quickly and the block I/O requests are routed around the failed path. Any increasing in loading is distributed over all of the available paths regardless of any interdependence between the host processors and any increase in the number of host processors active at any given time.

What is claimed is:

1. A method of load balancing in a data processing network, the data processing network including host data processors, a data storage system, and at least one data switch coupling the host data processors to the data storage system for receiving block I/O requests from the host data processors and transmitting block I/O requests to the data storage system, the data storage system including a storage controller and disk storage devices, the storage controller having host adapters and disk directors, the host adapters having host adapter ports coupled to said at least one data switch for receiving the block I/O requests transmitted by said at least one data switch, and disk directors having disk director ports coupled to RAID sets of the disk storage devices for transmission of single-block I/O requests from the disk director ports to the disk storage devices, said method comprising:
   (a) configuring the storage system so that each disk storage device is accessible from each host adapter port;
   (b) striping a file system across the RAID sets of the disk storage devices so that the file system is accessible by using all of the disk director ports of the storage system, and block I/O transfers for sequential read and write access to the file system are distributed across a set of disk director ports of the storage system;
   (c) configuring said at least one switch to distribute block read and write requests across the host adapter ports that are operable; and
   (d) programming the hosts to break up multi-block read or write requests into single block read or write requests for distribution of the single block read or write requests across the operable host adapter ports of the storage system; and
   (e) operating the data processing system so that the host data processors convert multi-block I/O requests into single-block I/O requests and send the single-block I/O requests to said at least one data switch and said at least one data switch distributes the single-block I/O requests over the operable host adapter ports for load-balancing of the single-block I/O requests among the operable host adapter ports.

2. The method as claimed in claim 1, wherein at least one of the host adapter ports is inoperable, and the method includes said at least one data switch skipping an inoperable host adapter port in a rotational sequence when distributing at least one of the single-block I/O requests to a next operable one of the host adapter ports in the rotational sequence.

3. The method as claimed in claim 1, wherein the disk storage devices are disk drives, and which includes partitioning the disk drives to provide more than one file system that is shared among the disk drives, shared among the host data processors, and striped across the RAID sets of disk storage devices.

4. The method as claimed in claim 3, which includes striping each of the file systems across the RAID sets of disk storage devices in a different sequence of the RAID sets of disk storage devices in order to reduce contention among the disk director ports during concurrent sequential access of the files systems.

5. A method of load balancing in a data processing network, the data processing network including host data processors, a data storage system, and at least one data switch coupling the host data processors to the data storage system for receiving block I/O requests from the host data processors and transmitting block I/O requests to the data storage system, the data storage system including a storage controller and disk storage devices, the storage controller having host adapters and disk directors, the host adapters having host adapter ports coupled to said at least one data switch for receiving the block I/O requests transmitted by said at least one data switch, and disk directors having disk director ports coupled to RAID sets of the disk storage devices for transmission of single-block I/O requests from the disk director ports to the disk storage devices, said method comprising:
   (a) configuring the storage system so that each disk storage device is accessible from each host adapter port;
   (b) striping a file system across the RAID sets of the disk storage devices so that the file system is accessible by using all of the disk director ports of the storage system, and block I/O transfers for sequential read and write access to the file system are distributed across a set of disk director ports of the storage system;
   (c) configuring said at least one switch to distribute block read and write requests across the host adapter ports that are operable; and
   (d) programming the switch to break up multi-block read or write requests from the host data processors into single block read or write requests for distribution of the single block read or write requests across the operable host adapter ports of the storage system; and
   (e) operating the data processing system so that said at least one data switch receives multi-block I/O requests from the host data processors and converts each multi-block I/O request into single-block I/O requests and distributes the single-block I/O requests over the operable host adapter ports for load-balancing of the single-block I/O requests among the operable host adapter ports.

6. The method as claimed in claim 5, wherein at least one of the host adapter ports is inoperable, and the method includes said at least one data switch skipping an inoperable host adapter port in a rotational sequence when distributing at least one of the single-block I/O requests to a next operable one of the host adapter ports in the rotational sequence.

7. The method as claimed in claim 5, wherein the disk storage devices are disk drives, and which includes partitioning the disk drives to provide more than one file system that is shared among the disk drives, shared among the host data processors, and striped across the RAID sets of disk storage devices.

8. The method as claimed in claim 7, which includes striping each of the file systems across the RAID sets of disk storage devices in a different sequence of the RAID sets of disk storage devices in order to reduce contention among the disk director ports during concurrent sequential access of the files systems.

* * * * *